Patented Aug. 17, 1954

2,686,778

UNITED STATES PATENT OFFICE 2,686,778

TREATMENT OF DEXTRAN

Ernest L. Wimmer, Springfield, Pa., assignor to The American Sugar Refining Company, New York, N. Y., a corporation of New Jersey No Drawing. Application April 23, 1952, Serial No. 284,004

11 Claims. (Cl. 260—209)

This invention relates to improvements in the treatment of dextran to effect reduction in viscosity and in molecular weight, and more particularly to the production of clinical dextran; and includes improved processes for treating dextran and improved dextran products.

The improved process of the present invention enables increased yields of degraded dextran products of limited molecular weight diversity to be obtained.

The invention includes an improved process for treating raw dextran by precipitation of the dextran in the form of alkaline-earth hydroxide complexes and by prolonged treatment of such complexes under alkaline conditions to reduce the viscosity and molecular weight of the dextran and the recovery of the dextran from such complexes in the form of a dextran of greatly reduced viscosity and molecular weight.

The invention includes a further treatment of the dextran so obtained by prolonged alkaline treatment, by limited acid hydrolysis to effect a further reduction in viscosity and in molecular weight.

The invention includes an improved process for treating acid hydrolyzed dextran, and particularly of acid hydrolyzed dextran of higher viscosity and molecular weight than desired for clinical dextran, by prolonged alkaline treatment, in the form of the alkaline-earth hydroxide complexes of the acid hydrolyzed dextran, to effect a further reduction in viscosity and in molecular weight to produce a product suitable for use as clinical dextran, either without or with a minimum of fractionation.

The invention also includes an improved process in which raw dextran is first subjected to such prolonged alkaline treatment in the form of its alkaline-earth hydroxide complexes, followed by limited acid hydrolysis and which, in turn, is followed by a further prolonged treatment of the acid hydrolyzed product as the alkaline earth hydroxide complexes by a second alkaline treatment, to produce an increased yield of clinical dextran suitable for use either without or with a minimum of further fractionation.

There is active interest at the present time in the use of dextran, and particularly of partially degraded dextran, in various phases of the program for stock-piling of blood, blood derivatives and their replacements or extenders for clinical purposes.

Raw dextran as it is produced by the microorganisms possesses high viscosity ($\eta_i = 0.8$–$1.5$) and a molecular weight of several million. In this form it has been found to be unsuitable for clinical application because it has an agglomerating effect upon the red blood cells and causes severe physical damage to certain vital organs. For these reasons, the dextran must be degraded to a range of molecular weights found suitable for the particular application. Thus dextran for use as a blood volume expander must be degraded to an average molecular weight of around 50,000–100,000.

The method heretofore proposed and used for the degradation of dextran has been acid hydrolysis. Acid hydrolysis of raw dextran isolated from the fermentation beer by precipitation with ethyl alcohol, or other organic solvents, or acid hydrolysis of the dextran beer itself, produces a hydrolyzate which contains part of the dextran in the form of dextran of desired average molecular weight, but a product which is composed of a wide scattering of molecular sizes. Some high molecular weight material of a deleterious nature, as well as low molecular weight material which is rapidly excreted by the kidney function and is, therefore, of little therapeutic value, are present. A relatively narrow range of molecular sizes is required for clinical acceptance. Fractionation of the hydrolyzate is, therefore, generally resorted to, using some water soluble organic solvent to accomplish the fractionation, and to separate the undesirable high molecular weight material and the undesirable low molecular weight material from the intermediate fraction.

In my prior application Serial No. 226,275, filed May 14, 1951, I have described a new method of fractionation of acid hydrolyzed dextran which does not employ organic solvents, but which is based on the differential solubility and stability of the dextran-alkaline-earth hydroxide complexes, upon acidification.

I have now found that a greatly increased yield of a product of limited molecular weight diversity can be obtained by a prolonged alkaline treatment of the dextran combined with a limited acid hydrolysis treatment; and that where the prolonged alkaline treatment precedes limited acid hydrolysis and is, in turn, followed by a further alkaline treatment, a clinical dextran product is obtained in high yield which does not require fractionation, or which requires only a very limited fractionation.

I have thus found that, when raw dextran, such as is produced by Leuconostoc fermentation, is precipitated as the calcium hydroxide complex and is subjected to prolonged alkaline treatment, or digesting, or ageing, the molecular weight of the raw dextran, commonly considered to have a molecular weight of several millions, can be greatly reduced in molecular weight and in viscosity, without creating the wide molecular weight spectrum which is produced by acidic degradation to the same average molecular weight. Thus, raw dextran which normally has a high viscosity and molecular weight of several millions ($\eta_i=0.8$–$1.5$) is exposed to controlled alkaline conditions; this treatment has been found to reduce the viscosity ($\eta_i=0.4$–$0.6$) without creating the wide molecular weight spectrum which is produced by acid degradation to the same average molecular weight. This desirable alkaline dissociation and accompanying reduction in molecular weight of the dextran is accomplished, most advantageously, by precipitation of the raw dextran as the dextran-calcium hydroxide complex and by suspending the complex in saturated lime water for a prolonged period of time. The alkali-dissociated dextran is then set free from the complex by treatment with a mineral acid.

I have found that, when such alkali-dissociated dextran is heated under controlled, mildly acidic conditions, advantageously a minimum degree of hydrolysis is accomplished and, after hydrolysis, a product possessing a somewhat lower viscosity ($\eta_i=0.35$–$0.45$).

I have further found that when the product of this mild acid hydrolysis is again subjected to controlled alkaline conditions, more particularly by precipitation as the calcium hydroxide complexes, and further prolonged treatment of such complexes under alkaline conditions, the dextran can be further reduced in viscosity (e. g. $\eta_i=0.18$–$0.28$) with a reduction of molecular weight to around 50,000–100,000 and with a minimum production of diverse molecular sizes in this product. The product is isolated from the calcium hydroxide complex by controlled acidification and further purification. This product may have such a minimum diversity as to be suitable for use directly without further fractionation. The product is obtained in excellent yield.

In the process described above, the greatest reduction in viscosity and in molecular weight is accomplished by the first alkaline treatment while the acid hydrolysis is of a very limited nature and stops short of the ultimate viscosity desired, and the acid hydrolyzed product is subjected to a further alkaline treatment to accomplish the final reduction in viscosity and in molecular weight to give a high yield of the desired clinical dextran product.

An alternative procedure, and one which is somewhat less desirable, is to carry out the acid hydrolysis of the alkali-treated dextran to reduce the viscosity to that desired in the final clinical dextran product. In this case, the reduction in viscosity from that of the alkali-treated dextran to that of the final clinical dextran is accomplished by a limited acid hydrolysis, much less than that involved when raw dextran is hydrolyzed directly, but somewhat more than that involved in the process above described where a final alkali treatment is employed for the final reduction in viscosity and in molecular weight.

An alternative procedure which is less desirable is one in which the acid hydrolysis is applied to the raw dextran, but with limitation of the acid hydrolysis so that the acid hydrolyzed product has a higher molecular weight and viscosity than that desired in the final product and in which this acid hydrolyzed product is then subjected to the prolonged alkaline treatment to effect further reduction in viscosity and in molecular weight to form the desired clinical dextran. In this case, some fractionation may be desirable, but the yield of the desired clinical dextran is materially improved over that obtained where the acid hydrolysis converts the raw dextran into the final product which is fractionated to form the clinical dextran.

In all of these alternative procedures, there is a combination of alkali-dissociation of the dextran by prolonged alkaline treatment with accompanying reduction in viscosity and in molecular weight and of limited acid hydrolysis to accomplish a limited reduction in viscosity and in molecular weight.

While I do not desire to limit myself by any theoretical explanation of the differences in the action of the alkaline treatment and of acid hydrolysis in degrading dextran, the results obtained seem to indicate that the prolonged alkaline treatment brings about a dissociation of the dextran in a different manner from that which occurs in acid hydrolysis. It is possible that the high molecular weight raw dextran, which is apparently an aggregation of dextran molecules bound together through hydrogen bonds, is dissociated largely, or completely, into individual dextran molecules through dissociation of the hydrogen bonds so that the alkali-treated dextran is represented by, or approximates a molecularly dispersed dextran. The action of acid, upon acid hydrolysis of dextran, seems to be more properly a true hydrolysis into smaller molecular aggregates, and when such acid hydrolyzed dextran is further treated by the prolonged alkaline treatment, it apparently accomplishes a dissociation of these smaller aggregates largely or completely into individual molecules through dissociation of the hydrogen bonds of the aggregates. Whatever the theoretical explanation may be, I have found that it is possible to produce greatly increased yields of clinical dextran by the combined alkaline treatment and limited acid hydrolysis with a greatly reduced diversity in the molecular weights of the final product.

The invention will be further illustrated by the following more detailed description.

Gum dextran as produced from sucrose by strains of Leuconostoc bacteria, particularly strains of L. mesenteroides and L. dextranicus is the starting material in this process. The raw dextran normally isolated from Leuconostoc fermentations possesses an intrinsic viscosity of 0.8–1.5 although other strains may be available which produce a dextran which falls outside these limits. The particular strain of L. mesenteroides used produces a dextran of $\eta_i=1.1$–$1.3$. The material may have been previously isolated from the fermentation by solvent precipitation, e. g., by methanol, or the whole fermentation beer may be utilized directly. In the latter instance it is advisable that the beer be free of reducing sugars, particularly the large quantity of fructose which is a by-product of the fermentation process.

Sugars are advantageously removed from the fermentation beer by fermentation with a rapid growing organism whose products of growth do not interfere with the subsequent recovery operations. The yeast, Saccharomyces cerevisiae, is most satisfactory. Several hours before the production of dextran has reached a maximum a live culture of the yeast is added and within 15–30 hours the reducing sugar content of the beer is reduced to a satisfactory level (0.2–0.6%).

When substantially reducing sugar-free beer is used as the starting material it is recommended that the beer be treated so as to remove the microorganisms and certain other inorganic and organic colloidal matter before the recovery of dextran. This is most advantageously accomplished by adjusting the pH value to 6.0–8.0 with alkali such as NaOH, KOH or Ca(OH)₂ and with the addition of the calcium chloride which is required for precipitation of the dextran in the succeeding step. Under these conditions a flocculent precipitate of waste materials is formed which is readily removed by centrifugation or filtration. This clarification step is facilitated by dilution of the beer to 2–5% dextran content and by warming preferably to 50–70° C.

The initial alkali-induced reduction in viscosity of the dextran is accomplished by precipitation of the raw dextran as an alkaline earth complex, making use of particularly the complexes with calcium hydroxide, strontium hydroxide and barium hydroxide, and prolonged treatment of the complex under alkaline conditions. The precipitation of the complex as the calcium hydroxide complex is particularly advantageous.

The dextran concentration of the solution used for the alkaline earth hydroxide complex precipitation is conveniently from 2% to 5%, whether in the clarified beer or in a solution prepared from a purified, solvent-precipitated dextran. The calcium hydroxide required for the precipitation of the lime complex is advantageously prepared in situ by adding solutions of a soluble calcium salt, advantageously calcium chloride, and caustic alkali, such as caustic soda, or caustic potash in sufficient amount to form calcium hydroxide. Part of the calcium hydroxide required can also be added as slaked lime, and part prepared in situ. The calcium hydroxide can also be used in sucrose solution. The calcium hydroxide requirement is approximately one gram mol for each anhydroglucose unit of dextran expressed in grams (162). A ten per cent excess of the reagents is generally employed. Precipitation of the calcium hydroxide dextran complex takes place rapidly, when the calcium hydroxide is prepared in situ, and a flocculent precipitate is formed in the agitated mixture.

The precipitated dextran-calcium hydroxide complex is generally recovered by centrifugation and then washed to remove by-product sodium chloride and other impurities. Washing is particularly advisable if the Leuconostoc beer is the source of the dextran for the precipitation.

Saturated lime water is advantageously used as the washing medium to reduce the solubility of the complex.

The dextran-calcium hydroxide complex is then suspended, with agitation, in an alkaline solution, advantageously a saturated solution of lime water, and is maintained for a sufficient time and temperature to accomplish the radical reduction in the viscosity and molecular weight of the dextran. These conditions should be adjusted so that the viscosity of the dextran in the precipitate is reduced to a minimum, or to practically the minimum limiting value obtainable at this stage of the process. The holding time is an inverse function of the temperature. By selecting appropriate conditions, the reduction in viscosity can be obtained in part concurrently with the precipitation and with prolonged washing of the lime complex.

The following table shows the conditions observed in reducing the intrinsic viscosity of dextran prepared as above described from an initial viscosity of 1.1 to 1.3 to a final viscosity of 0.40 to 0.55. This table shows the time and temperature during which the complex was subjected to prolonged alkaline treatment in the presence of saturated lime water.

*Conditions for dissociation of raw dextran ($\eta_i = 1.2$) by precipitation as calcium hydroxide complex*

| Temp., ° C. | Time, Hrs. | $\eta_i$ |
|---|---|---|
| 25 | 16 | 0.55 |
| 55 | 8 | 0.50 |
| 100 | 2 | 0.44 |
| 125 | 1 | 0.40 |

After this alkaline dissociation, the calcium hydroxide complex is separated from the lime water, suspended in water, and dissolved by treatment with an acid in amount sufficient to give an approximately neutral pH value. It is advantageous to use an acid which forms an insoluble calcium salt so that as much ash removal as possible is obtained during solution of the dextran contained in the complex. Carbonic, sulfuric, sulfurous and phosphoric acids are satisfactory, but the first two are more advantageous. It is also advantageous to use an acid, such as hydrochloric acid, at this stage so that calcium chloride is formed and left in solution with the dextran, particularly where the dextran is to be subjected to a limited acid hydrolysis and to a subsequent further re-precipitation of the dextran as a calcium hydroxide complex in a further step of the process; since the calcium chloride present in the dextran makes unnecessary the addition of a corresponding amount of calcium chloride for reaction with caustic alkali in forming the complex.

After the dextran has been redissolved from the calcium hydroxide complex with acid, the filtrate is hydrolyzed under mild conditions with a mineral acid catalyst. The selection of the acid used does not appear to be critical, but hydrochloric acid is advantageously used. It is however, critical that the solution be heated for a limited and minimum time at the pH value and temperature used to accomplish the desired reduction in viscosity and in apparent molecular weight. The hydrolytic conditions are thus advantageously adjusted so that the intrinsic viscosity of the dextran in the hydrolyzate is reduced to $\eta_i = 0.35$–$0.45$, this being a viscosity which is higher than that ultimately desired in the clinical dextran product. The acid hydrolysis can be carried at this stage to the point where the final desired viscosity of the clinical dextran is obtained, but somewhat less satisfactory products are obtained when the acid hydrolyzed product is carried to such lower viscosities.

The hydrolyzed dextran is then re-precipitated as the calcium hydroxide complex. As with the precipitation previously described, calcium chloride and sodium hydroxide are advantageously used to form the calcium hydroxide for the complex. And where calcium chloride has been previously formed by the use of hydrochloric acid to decompose the calcium hydroxide-dextran complexes, this calcium chloride can be utilized in the later precipitation. Approximately one gram mol of calcium hydroxide must be formed by these reagents for each anhydroglucose unit expressed in grams. A 10% excess of each reagent is advisable.

The precipitated calcium hydroxide complex of the hydrolyzed dextran is also subjected to prolonged alkaline treatment, or digestion, or ageing, advantageously in the presence of saturated lime water, to accomplish a further reduction in viscosity and in molecular weight.

The conditions of time and temperature are selected to yield a limited minimum value of the viscosity. The intrinsic viscosity of the dextran produced by this step is around 0.18 to 0.28. Generally several hours holding time at ordinary temperatures is sufficient to yield the desired product.

After this further treatment, the dextran-calcium hydroxide complex is isolated by centrifuging or filtration. In order to separate the dextran from this complex, it is suspended in water and the dextran is dissolved by treating with acid, advantageously an acid which forms an insoluble calcium salt. The ash content of the resulting solution of dextran is reduced in this manner. An acid from the group which consists of carbonic, sulfuric, sulfurous, and phosphoric, is advantageously used.

The filtrate from the insoluble calcium salt is then further purified. The solution can be effectively demineralized by contact with appropriate synthetic resin ion exchangers. Conventional treatment by passage through columns of cation exchanger in the acid form and anion exchanger in the base form is applicable. A strong acid resin, such as that known by the trade name Amberlite IR-120 can be used with a strong base resin, such as that known as Amberlite IRA-400, or a moderately weak base resin, such as that known as Amberlite IR4B. The use of a strong base resin with a strong acid resin is particularly advantageous because ash removal is accompanied by considerable color removal. Further decolorization can be accomplished by treating the demineralized solution with a synthetic decolorizing resin, such as Permutit DR. Other adsorbent materials, such as activated carbons and clays, may also be used.

The purified solution of dextran which is thus obtained may be concentrated to, e. g., around 6% and packaged with saline in a sterile isotonic solution, as required by clinical specifications; or it can be concentrated, dried, and marketed in a stable powder form ready for reconstitution with isotonic saline.

As an alternative to the demineralization and decolorization procedure described, the dextran, after it has been set free from the lime complex by treatment with acid, may be recovered free of ash by precipitation with water miscible solvents such as methanol, ethanol, acetone, etc.

As a further modification, the dextran may be rendered free of ash and of low molecular weight product contamination by dialysis of the impurities through a semi-permeable membrane.

The foregoing description provides a practical means of obtaining a dextran product which is satisfactory for clinical dextran, without fractionation.

Should a somewhat higher, or lower, molecular weight product be desired, the alkali dissociating and acid hydrolytic treatments can be modified. It is one advantage of the process above described that the hydrolysis with acid is of a very limited nature and is applied to dextran which has been reduced by prolonged alkaline treatment to a far lower viscosity and molecular weight than the raw dextran. And it is one advantage of this process that the final dextran product is obtained with less molecular weight diversity than that obtainable by acid degradation to the corresponding average molecular size.

It will also be understood that, by varying the alkaline dissociating and acid hydrolyzing treatments, similar products of somewhat higher molecular weight, or somewhat lower molecular weight can also be obtained, and with a greater uniformity in the molecular weights of the product produced.

It will be noted from the foregoing description that the initial alkaline treatment of the raw dextran brings about a radical reduction in viscosity and in molecular weight, and produces a product with a greater uniformity, or less diversity, in molecular weight than in an acid hydrolyzed product. Thus, by the treatment above described, raw dextran, having an intrinsic viscosity of around 1.2, was reduced by the alkaline treatment to a viscosity around 0.55 to 0.40. Where the initial dextran has a lower intrinsic viscosity, the alkali-treated product will, in general, have a lower intrinsic viscosity, and this viscosity may be such as to require little if any further acid hydrolysis treatment to produce clinical dextran.

Where the raw dextran is produced by other micro-organisms and is of lower viscosity and molecular weight than that above referred to, products of lower and varying viscosity and molecular weight can be prepared by the treatment above described.

It is one advantage of the present process, particularly where the reduction in viscosity by prolonged alkaline treatment precedes the limited acid hydrolysis, that dextran products can be obtained, without resorting to fractionation, with varying average size far below that of the raw dextran, and with less molecular weight diversity than is obtainable by acid degradation to the corresponding average molecular size.

It will be understood, however, that the present process can be combined with fractionation of the products, to give improved yields of the desired fractions, and fractions of a more homogeneous character.

The following example illustrates the process in which the prolonged alkaline treatment is followed by a limited acid hydrolysis and by a final alkaline treatment. The example illustrates the production of dextran by fermentation, the removal of fermentable sugars from the solution, the precipitation of the dextran in the form of the calcium hydroxide complex, and the further treatment of this complex.

*Example 1.*—The production of dextran by fermentation is conducted in a medium of the following composition:

| | Pounds |
|---|---|
| Sucrose | 77 |
| K$_2$HPO$_4$ | 3.8 |
| NaCl | 0.8 |
| MgSO$_4$.7H$_2$O | 0.16 |
| (NH$_4$)SO$_4$ | 0.4 |
| Brewers' yeast | 3.8 | pH to 7.6±0.2.
Dilute to 100 gallons with tap water.

The sterile medium is inoculated with a strain of *L. mesenteroides* which produces a high yield of dextran and is incubated at 25° C. for 24 hours or until the production of dextran is nearly complete, whereupon a culture of *S. cerevisiae* is added and the fermentation is continued 24 hours or until the residual sugars concentration is 0.2–0.6%.

Forty-two pounds of calcium chloride

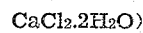

is added and the pH value is adjusted to 6.0 with sodium hydroxide and the beer is diluted to 200 gallons. The beer is heated to 60° C. and is centrifuged to remove a flocculent precipitate composed essentially of cellular debris, insoluble calcium salts, particularly the phosphate and sulfate and other undesirable constituents.

To the resulting solution, which contains the amount of calcium chloride required for forming the calcium hydroxide complex, is added a sodium hydroxide solution containing 24 pounds of NaOH, with agitation. A voluminous white precipitate of the calcium hydroxide-dextran complex forms immediately and is collected in a solid basket centrifuge.

This precipitate is suspended in sufficient saturated lime water to bring the volume to 100 gallons and the resulting slurry is held at a temperature of 25 to 30° C. for about 12 hours at which time the dextran isolated from a small sample was found to have an intrinsic viscosity of about 0.55. After this treatment for reducing the viscosity of the dextran, the insoluble calcium hydroxide-dextran complex is again separated by centrifuging, then mixed with water to form a slurry and diluted to approximately 140 gallons. Carbon dioxide is bubbled into the well-stirred reaction mixture until the pH is 8.5. This sets free the dextran which goes into solution and converts the calcium hydroxide into calcium carbonate. The reaction mixture is then filtered to remove calcium carbonate and other insoluble impurities. The dextran at this point has an intrinsic viscosity of about 0.55. It is a highly uniform product.

The dextran solution is then subjected to limited acid hydrolysis by heating to 90° C., adjusting the pH to 1.8 with hydrochloric acid, and continuing the hydrolysis for 1 hour or until the intrinsic viscosity of the dextran is reduced to 0.35–0.45. This product is also a highly uniform product.

After this limited acid hydrolysis the hydrolyzate is cooled to 30° C. and 40 pounds of calcium chloride ($CaCl_2.2H_2O$) is added. The hydrolyzed dextran is precipitated as the calcium hydroxide complex by the addition of 22 pounds of sodium hydroxide in an 18% aqueous solution, and this precipitate is maintained under alkaline conditions by stirring the suspension about 2 hours or until the intrinsic viscosity of the dextran is reduced to 0.18–0.28. The precipitate is recovered by a centrifuge. The precipitate is then suspended in 50 gallons of water, and treated with 25% sulfuric acid solution until a pH value of 6.5–7.0 is reached. The precipitated calcium sulfate is filtered off and the solution is demineralized by passing with downward flow through consecutive columns of the cation exchange resin, Amberlite IR–120 and the anion exchange resin Amberlite IRA–400. The demineralized product is concentrated in vacuo to 20% dextran concentration and is spray dried. A yield of 20 pounds was obtained. The intrinsic viscosity of this final product was 0.26.

The following example illustrates a modified and somewhat different process in which the raw dextran is first subjected to acid hydrolysis which is limited in character to obtain an acid hydrolyzed product of intermediate viscosity and molecular weight and which is then subjected to an alkaline treatment to effect the final reduction in viscosity and in molecular weight to give an increased yield of clinical dextran. Instead of hydrolyzing the dextran initially to a low viscosity it is hydrolyzed directly to an intermediate viscosity, e. g., to a material having an intrinsic viscosity of around 0.35–0.45, formed into a dextran calcium hydroxide complex and further treated under alkaline conditions to reduce the viscosity to around 0.18–0.28. In this case the dextran is subjected to acid hydrolysis without preliminary alkaline disaggregation, but the acid hydrolysis is limited and is followed by an alkaline disaggregation and further reduction in viscosity of the acid hydrolyzed product.

*Example 2.*—100 gallons of *L. mesenteroides* beer was fermented and freed from sugars as in Example 1, and treated with calcium chloride and then diluted and clarified according to Example 1.

The clarified beer was subjected to acid hydrolysis by acidifying to a pH value of 1.5 and heating for 1 hour at 90° C. The solution was then cooled to 35° C. and a sodium hydroxide solution containing 24 pounds of caustic soda was then added with agitation to precipitate the hydrolyzed dextran as the calcium hydroxide complex. The precipitate which formed immediately was isolated by centrifugation. The precipitated complex was suspended in lime water to a total volume of 100 gallons and the slurry was held 12 hours at 25–30° C. to effect a further reduction in viscosity and in molecular weight of the hydrolyzed dextran.

The precipitated complex, after this prolonged alkaline treatment, was collected by centrifugation, suspended in 50 gallons of water, and treated with carbon dioxide to precipitate calcium carbonate and form a solution of the dextran. Demineralization and drying were conducted as in Example 1.

The resulting dried product had an intrinsic viscosity of 0.24 and was a colorless product of high purity. In homogeneity it approached the product of Example 1 but was somewhat less uniform, but was a far more uniform product than the product obtained by simple acid hydrolysis of the raw dextran to the same average molecular weight.

A further modification of the process in which the raw dextran is first subjected to a prolonged alkaline treatment as in Example 1 but in which the acid hydrolysis is carried to the final viscosity, without a final alkaline treatment is illustrated by the following example. In this case the major reduction in viscosity is accomplished by the first alkaline treatment and the dissociation of the raw dextran into a product of low viscosity and molecular weight and this product is then subjected to acid hydrolysis which is carried to the point where the hydrolyzed product has the desired viscosity and molecular weight for clinical dextran.

*Example 3.*—100 gallons of *L. mesenteroides* beer is treated as in Example 1 to precipitate the raw dextran as the calcium hydroxide complex and with prolonged treatment of the complex under alkaline conditions to bring about reduction in viscosity and in molecular weight.

The dextran solution obtained from the alkali treated dextran of Example 1 is acidified to a pH of 1.65 with hydrochloric acid and heated for 1 hour at 90° C. to hydrolyze the dextran to a viscosity of about 0.23. The hydrolyzate is then cooled and demineralized and spray dried as described in Example 1.

The homogeneity of the product thus produced is somewhat similar to that of Example 2 but with a somewhat reduced amount of high molecular weight material.

The product of Examples 2 and 3 can be further fractionated, where desirable or necessary, to remove the small amounts of higher molecular weight and lower molecular weight fractions which they may contain. This fractionation can be accomplished by fractional precipitation with organic solvents or by fractionation of the calcium hydroxide complexes as described in my prior application Serial No. 226,275. The product of Example 1 can similarly be fractionated when necessary but this further fractionation may be unnecessary because of the uniformity of the product.

The use of calcium chloride and sodium hydroxide for forming the calcium hydroxide can be modified by replacing part of these reagents with slaked lime as illustrated by the following example.

*Example 4.*—100 parts of sugar-free beer produced as described in Example 1 is treated with slaked lime to a pH value of 6.0–8.0 and is centrifuged to remove precipitated waste material. A 25% slurry of slaked lime is prepared and 4 parts of this slurry are added to the dextran beer, corresponding to about 0.65 mole of calcium hydroxide per mole of anhydroglucose. The mixture is diluted with an equal volume of water and stirred for one-half hour and there is then added calcium chloride and sodium hydroxide to complete the precipitation of the dextran as the calcium hydroxide complex. The amounts of calcium chloride and of caustic soda required are sufficient to produce 0.65 mole of calcium hydroxide per mole of anhydroglucose. The precipitated calcium hydroxide-dextran complex is then washed and aged under alkaline conditions as described in Example 1. The dextran of reduced viscosity is separated from the complex as described in Example 1 and is further treated as described in Example 1 or as described in Example 3 to produce the final dextran product of low viscosity.

Instead of producing the calcium hydroxide in situ, calcium hydroxide can be dissolved, e. g., in sucrose solutions and such solutions used for treating the dextran. The solubility of lime in sucrose solutions is much greater than its solubility in water; and lime when so dissolved is capable of precipitating the dextran directly from solution as the calcium hydroxide complex without resorting to the use of soluble calcium salts and caustic soda as the source of the calcium hydroxide. This is illustrated in the following example.

*Example 5.*—A solution of lime in sucrose solution was prepared by slaking 1 part of lime in 3 parts of water and adding the slaked lime sludge to a solution of 3 parts sucrose in 5 parts of water. 100 parts of a sugar-free dextran beer prepared as described in Example 1 was clarified by centrifugation after adjustment of the pH value to 6.0 with lime. Then 25 parts of the above described lime-sucrose solution was added, corresponding to 1.3 moles of calcium hydroxide per mole of anhydroglucose. Precipitation of the calcium hydroxide-dextran complex takes place at once and the precipitate is then subjected to prolonged alkaline treatment as described in Example 1; and the low viscosity dextran set free from the complex is further treated as in Example 1 or Example 3 to produce the final low viscosity dextran product.

When such a lime-sucrose solution is used, sucrose will be present in the solution from which the precipitated complex is separated and this sucrose may be utilized to a greater or less extent in the preparation of a succeeding batch of fermentation medium.

The present process enables high yields of clinical dextran to be produced of around e. g., 20% of the original sucrose and around 45–50% of the dextran treated, whereas the yields of clinical dextran produced by acid hydrolysis and fractionation with organic solvents has been only around, e. g., 10–12%, based on the original sucrose.

In the acid hydrolyzed product, in which the raw dextran is hydrolyzed directly with acid to form the clinical dextran, the acid hydrolysis produces a broad diversity of molecular sizes, the spectrum of which must be narrowed by fractionation to produce a therapeutic dextran of high quality, and only around a third of the hydrolyzed dextran is present in the fraction acceptable as a blood volume expander. The product of the present invention is a more homogeneous product.

A test of homogeneity of clinical dextran is the methanol precipitation test described, for example, in the National Bureau of Standards Report No. 1160, "Molecular Properties of Plasma Substitutes." When methanol is gradually added to an aqueous solution of dextran, a critical concentration of methanol is reached at which precipitation of dextran is induced. The highest molecular weight dextran is precipitated initially and as the concentration of methanol is increased the lower molecular weight material is precipitated. The methanol concentration at which precipitation is induced is regarded as some criterion of the size of the highest molecular weight material present. More significant, however, is the range of methanol concentrations between that required to induce precipitation and that required to precipitate some fixed percentage of the total dextran present, e. g., 60%. In general the homogeneity of the dextran is an inverse function of the magnitude of the difference between these critical methanol concentrations, i. e., the more homogeneous dextran is precipitated within a narrower range of methanol concentrations. This comparison is of greatest value in comparing dextrans of approximately the same average molecular weight.

The following table gives the results of this methanol precipitation test as applied to the raw dextran and the dextran products produced by the three steps of Example 1.

*Homogeneity of dextrans produced in Example 1 as indicated by cumulative methanol precipitability*

[Methanol added to 6% dextran solutions]

| Dextran Sample | $\eta$ | (1) Methanol Conc'n. at Initial Precipitation, Percent | (2) Methanol Conc'n. at 60% Precipitation, Percent | (2) minus (1) Range of Methanol Conc'n. for 60% Precipitation |
|---|---|---|---|---|
| A. Raw dextran in beer | 1.20 | 36.2 | 38.6 | 2.4 |
| B. Raw dextran after aging as calcium hydroxide complex | 0.55 | 38.4 | 40.5 | 2.1 |
| C. Hydrolyzed dextran from B before second aging as calcium hydroxide complex | 0.40 | 40.4 | 44.5 | 4.1 |
| D. Hydrolyzed dextran from C after aging as calcium hydroxide complex (Clinical dextran) | 0.24 | 43.0 | 48.8 | 5.8 |

The final product of this table was similar to that of a fractionated clinical dextran produced by acid hydrolysis and by fractionation of the hydrolyzed product. This fractionated clinical dextran had a methanol concentration at initial precipitation of 43.6% and a methanol concentration at 60% precipitation of 48.6%, or a range of methanol concentration for 60% precipitation of 5.0%.

The final dextran products produced by Examples 2 and 3 when subjected to this same methanol precipitation test showed a methanol concentration at initial precipitation of 41.8% and a methanol concentration at 60% precipitation of 49.7%, or a range of methanol concentration for 60% precipitation of 7.9%.

In comparison with these results a sample of unfractionated dextran produced by acid hydrolysis of the raw dextran and having an average viscosity of 0.25 gave an initial precipitation at a methanol concentration of 40.0%, with 60% precipitation at a methanol concentration of 51.4%, or a range of methanol concentration for 60% precipitation of 11.4.

The new dextran products, as above indicated, can in some cases be used directly as clinical dextran without further fractionation; and where fractionation is required to eliminate the relatively small amounts of high molecular and low molecular weight products a greatly increased yield of intermediate fractions of clinical dextran can be obtained, as compared with the known products of simple acid hydrolysis.

The precipitation of the dextran as a calcium hydroxide complex takes place under alkaline conditions. The precipitation of the dextran complex begins when the pH value reaches around 11.5-12.0; and an excess of e. g., 10% of calcium hydroxide is desirable as previously pointed out. The reaction when calcium chloride and sodium hydroxide are used, and also when a lime-sucrose solution is used, is instantaneous and with effective agitation the dextran-calcium hydroxide complex comes down as a white, somewhat fluocculent, amorphous solid which is readily recovered by centrifuging in a solid bowl type centrifuge or its equivalent. Sedimentation of the precipitated complex is comparatively rapid.

The prolonged alkali treatment of the complex to bring about reduction in viscosity and in molecular weight is also carried out under alkaline conditions such as those present with saturated lime water at a pH value of around 12.8. Where the final product is fractionated as described in my prior application the entire fractionation can be carried out between the pH range of 12.8–11.8, by fractional acidification and setting free of successive fractions of dextran as described in said application.

The prolonged alkaline treatment is advantageously carried out with saturated lime water. But instead of using lime water a small amount of caustic soda can be used to maintain the solution alkaline during the prolonged alkaline treatment. Even with water alone the alkalinity of the alkaline earth-dextran complex is such that the ageing and reduction in viscosity will take place under alkaline conditions; but it is more advantageous to add a small amount of alkali to maintain the alkaline conditions, and particularly to use a saturated lime water solution for this purpose.

While the invention has been described more particularly in connection with precipitation of the raw dextran or of the partially hydrolyzed dextran as the calcium hydroxide complex, it can also be precipitated as the barium hydroxide complex or as the strontium hydroxide complex; and these complexes can be similarly treated under alkaline conditions to effect the reduction in viscosity and in molecular weight.

When the dextran is precipitated as the calcium hydroxide complex it is advantageous to use the calcium hydroxide, or salts which produce it, in a soluble form. The use of calcium chloride for precipitation of the calcium hydroxide complex with the subsequent addition of caustic alkali is particularly advantageous. And when the calcium chloride is added to the fermentation beer prior to clarification it aids in the clarification and is present for subsequent reaction with the caustic alkali to form the complex. Similarly where the complex produced by the first prolonged alkaline treatment is treated with acid to set free the dextran the use of hydrochloric acid results in the formation of calcium chloride which after the limited acid hydrolysis can be used, with such added calcium chloride as may be needed, for subsequent reaction with caustic alkali to precipitate the complex from the acid hydrolyzed product.

The intermediate alkaline earth hydroxide complexes resulting from the precipitation of the dextran as an alkaline earth hydroxide complex and prolonged alkali treatment of the complex are new products characterized by their combination of the alkaline earth hydroxide and dextran and a complex from which low molecular weight and low viscosity dextran can be produced by acid treatment to free the dextran from the complex.

The dextran so produced from the complexes after this prolonged alkali treatment is also a new form of dextran of radically lower viscosity and molecular weight than the raw dextran, and characterized by a distinctive uniformity in composition, being apparently made up entirely or almost entirely of individual dextran molecules produced by alkali treatment and dissociation of the highly aggregated raw dextran. Thus, while the raw dextran has molecular weight of several million, it can be dissociated by the prolonged alkali treatment to a molecular weight of around 125,000–200,000 without creating the wide molecular weight spectrum and diverse molecular sizes of acid hydrolyzed products.

The final product resulting from the process in which the alkali treatment is relied upon to effect a further reduction in viscosity and in molecular weight, following the limited acid hydrolysis, also appears to be a distinctive product in that the aggregates appear to be dissociated and of a greater linearity and uniformity than in the case of clinical dextran produced by the acid hydrolysis process.

The final product as well as the intermediate products will vary with the raw dextran used as well as with variations in the process. The process is applicable to dextran produced from various strains of bacteria, other than that specifically described. Where the raw dextran has a different viscosity, such as a materially lower viscosity, the various products produced by alkaline treatment, or by combined alkaline dissociation and limited acid hydrolysis, may similarly vary in viscosities and other physical characteristics; but will be characterized by greater uniformity than in the case of products produced by the acid hydrolysis process.

I claim:

1. The method of treating dextrans which comprises reacting the dextran in aqueous solution with an alkaline earth metal hydroxide in amount sufficient to precipitate substantially all of the dextran as an alkaline earth hydroxide-dextran complex, subjecting such complex to alkali treatment for a sufficient period of time to effect a substantial reduction in the viscosity and molecular weight of the dextran, and freeing the dextran from such alkaline treated complex by treatment with an acid to form an alkaline earth salt of such acid.

2. The process according to claim 1 in which the dextran is precipitated as a calcium hydroxide-dextran complex and in which the alkali treatment is carried out in the presence of a saturated solution of lime water.

3. The process according to claim 1 in which dextran having a viscosity of around 0.8–1.5 is precipitated as the alkaline earth hydroxide-dextran complex and the latter is subjected to the alkali treatment for a sufficient period of time to produce dextran having a viscosity of around 0.4–0.6.

4. The process according to claim 1 in which the dextran is first subjected to hydrolysis by treatment with acid to effect partial hydrolysis thereof, and the resulting partially hydrolyzed dextran is treated according to claim 1 with an alkaline earth metal hydroxide to precipitate an alkaline earth hydroxide dextran complex, and the latter is subjected to the alkali treatment to effect a further reduction in viscosity.

5. The process according to claim 1 in which the dextran set free from the complex is further subjected to hydrolysis by treatment with acid to effect a further reduction in viscosity.

6. The process according to claim 1 in which the dextran set free from the complex is subjected to a further hydrolysis by treatment with acid to produce a product having a viscosity and molecular weight somewhat higher than that required for clinical dextran, and in which the acid-hydrolyzed product is subjected to a further precipitation as alkaline earth complex and a further alkaline treatment to effect a further reduction in viscosity.

7. The process of treating dextran which comprises reacting the dextran in aqueous solution with calcium hydroxide in amount sufficient to precipitate substantially all of the dextran as a calcium hydroxide-dextran complex, subjecting the complex to alkali treatment for a sufficient period of time in the presence of an alkaline solution selected from the class which consists of an alkali and an alkaline earth hydroxide solution until the viscosity of the dextran separated from the complex is around 0.4–0.6 and adding acid to the complex to set free the dextran in the form of an aqueous solution.

8. The process according to claim 7 in which the dextran separated from the complex is subjected to acid hydrolysis to effect a further reduction of the viscosity to around 0.18–0.28.

9. The process according to claim 7 in which the dextran having a viscosity of around 0.4 to 0.6 is further treated by hydrolysis with acid to reduce its viscosity to around 0.35–0.45 and in which the acid-hydrolyzed product is precipitated as the calcium hydroxide complex and the latter subjected to a further alkaline treatment to effect a further reduction in viscosity to around 0.18–0.28.

10. The process of treating dextran which comprises subjecting dextran to acid hydrolysis to produce an acid hydrolyzed dextran having a viscosity around 0.35–0.45, reacting the acid hydrolyzed product in aqueous solution with calcium hydroxide in amount sufficient to precipitate substantially all of the product as the calcium hydroxide complex and subjecting the complex to alkali treatment for a sufficient period of time to reduce the viscosity of the dextran set free from the complex to around 0.18–0.28.

11. As a new product a calcium hydroxide-dextran complex of alkali degraded dextran having a viscosity when set free from the complex, of around 0.4–0.6.

References Cited in the file of this patent

UNITED STATES PATENTS

| Number | Name | Date |
| --- | --- | --- |
| 2,437,518 | Gronwall et al. | Mar. 9, 1948 |
| 2,565,507 | Lockwood | Aug. 28, 1951 |
| 2,644,815 | Gronwall et al. | July 7, 1953 |

OTHER REFERENCES

Gronwall: Nature, page 45, January 13, 1945.